United States Patent [19]
Kasahara

[11] Patent Number: 5,381,432
[45] Date of Patent: Jan. 10, 1995

[54] GAS LASER OSCILLATOR

[75] Inventor: Shinji Kasahara, Tokyo, Japan

[73] Assignee: NEC Corporation, Japan

[21] Appl. No.: 257,944

[22] Filed: Jun. 10, 1994

Related U.S. Application Data

[63] Continuation of Ser. No. 941,387, Sep. 8, 1992, abandoned.

[30] Foreign Application Priority Data

Sep. 10, 1991 [JP] Japan .................................. 3-229302

[51] Int. Cl.⁶ ............................................. H01S 3/00
[52] U.S. Cl. ................................................... 372/37
[58] Field of Search ............................. 372/76, 37, 61

[56] References Cited

U.S. PATENT DOCUMENTS 5,115,439  5/1992  Howard ............................. 372/61

Primary Examiner—Léon Scott, Jr.
Attorney, Agent, or Firm—Laff, Whitesel, Conte & Saret, Ltd.

[57] ABSTRACT

A gas laser oscillator according to the present invention comprises an ion laser tube provided with a capillary tube and an anode and a cathode as discharging electrodes disposed at its ends, plasma focusing electromagnets to generate the magnetic field for plasma focusing disposed around the ion laser tube, and a pair of optical resonance mirrors disposed at both ends of the ion laser tube, and is characterized by that the magnetic field strength at the cathode end face is set to 100 gauss or less and that the diameter of the lines of magnetic flux at the cathode end face is made to be smaller than the diameter of the capillary tube at the capillary tube end face.

16 Claims, 4 Drawing Sheets

Bc: CATHODE END MAGNETIC FIELD (GAUSS)

B: CAPILLARY END MAGNETIC FIELD (GAUSS)

rc: RADIUS OF CATHODE END (mm)

r: RADIUS OF LINES OF MAGNETC FLUX FLUX AT CATHODE END FOR MAGNETIC FIELD OF B

GAS LASER OSCILLATOR

This application is a continuation of application Ser. No. 07/941,387, filed Sep. 8, 1992 and now abandoned.

BACKGROUND OF THE INVENTION

1. Field of the Invention

This invention relates to a gas laser oscillator, and particularly relates to a laser oscillator designed to elongate the service life of the ion laser tube.

2. Description of the Prior Art

A conventional gas laser oscillator comprises an ion laser tube provided with a capillary tube and a cathode and an anode as discharging electrodes, electromagnets for plasma focusing arranged around the ion laser tube, and a pair of mirrors for optical resonance at the both ends of the ion laser tube. Application of voltage from the power supply across the cathode and the anode causes plasma discharge. The direct current voltage has been already applied to the electromagnets for plasma focusing. The magnetic field given by the plasma focusing magnets works so that the plasma generated between the cathode and the anode is focused. When the ion laser tube discharges, the mirrors at the both ends cause optical resonance and the laser beam is obtained.

Since conventional gas laser oscillators as described above are designed considering the magnetic field strength at the capillary tube in the ion laser tube only, the cathode end face also has a considerably high magnetic field strength. Usually, the capillary tube is subjected to the magnetic field of about 1,000 gauss and the magnetic field strength near the cathode end face is about 500 to 800 gauss. For this reason, plasma tends to concentrate to a certain limited part on the cathode, which deteriorates the cathode resulting in shorter service life of the ion laser tube.

Besides, since the diameter of the lines of the magnetic flux covering the cathode end face becomes larger than the diameter of the capillary tube at the end of the capillary tube, the plasma does not sufficiently focus at the end of the capillary tube. This causes plasma crushing at the capillary tube end involving extremely high temperature, resulting in evaporation at the end face of the capillary tube (sputtering). As a result, substances separated from the end face of the capillary tube due to evaporation make the Brewster windows on the cathode side and the anode side dirty and confine the argon gas (gas laser medium in the ion laser tube) leading to gas consumption, which reduces the service life of the ion laser tube.

SUMMARY OF THE INVENTION

A first object of the present invention is to provide a gas laser oscillator which improves the service life of ion laser tubes by protecting cathode deterioration due to inappropriately focused discharge plasma on a particular part of the cathode.

A second object of the present invention is to provide a gas laser oscillator which improves the service life of the ion laser tubes by reducing sputtering generated at the end face of the capillary tube.

According to a preferred embodiment of the present invention to attain the first object above, a gas laser oscillator comprises an ion laser tube provided with a capillary tube and an anode and a cathode as discharging electrodes disposed at its both ends, plasma focusing electromagnets to generate the magnetic field for plasma focusing disposed around the ion laser tube, and a pair of optical resonance mirrors disposed at both ends of the ion laser tube, and is characterized by that the magnetic field strength at the end face of the cathode is set at 100 gauss or less.

According to another preferred embodiment, the magnetic field of the plasma focusing electromagnets is adjusted so that the magnetic filed strength at the cathode end face is 100 gauss or less, and the cathode is disposed at such a position that the magnetic field strength at the cathode end face becomes 100 gauss or less.

According to still another preferred embodiment to attain the second object above, a gas laser oscillator comprises an ion laser tube provided with a capillary tube and an anode and a cathode as discharging electrodes disposed at its both ends, plasma focusing electromagnets to generate the magnetic field for plasma focusing disposed around the ion laser tube, and a pair of optical resonance mirrors disposed at both ends of the ion laser tube, and is characterized by that the diameter of the lines of magnetic flux at the cathode end face is made to be smaller than the diameter of the capillary tube at the end face of the capillary tube.

According to a further preferred embodiment, the plasma focusing electromagnets are disposed so that the diameter of the lines of magnetic flux at the cathode end face becomes smaller than the diameter of the capillary tube at the end face of the capillary tube. In addition, the positions of the cathode and the capillary tube are determined so that the diameter of the lines of magnetic flux at the cathode end face becomes smaller than the diameter of the capillary tube at the capillary tube end face. Alternatively, a taper having a diameter larger than that of the lines of magnetic flux at the cathode end face is formed near the end face of the capillary tube.

According to another embodiment of the present invention to attain the first and the second objects above, a gas laser oscillator comprises an ion laser tube provided with a capillary tube and an anode and a cathode as discharging electrodes disposed on its both ends, plasma focusing electromagnets to generate the magnetic field for plasma focusing disposed around the ion laser tube, and a pair of optical resonance mirrors disposed at both ends of the ion laser tube, and is characterized by that the magnetic field strength at the end face of the cathode is set at 100 gauss or less and that the diameter of the lines of magnetic flux at the cathode end face is made to be smaller than the diameter of the capillary tube at the end face of the capillary tube.

According to a further preferred embodiment, the magnetic field of the plasma focusing electromagnets is adjusted so that the magnetic filed strength at the cathode end face is 100 gauss or less. In addition, the cathode is disposed at such a position that the magnetic field strength at the cathode end face becomes 100 gauss or less.

According to still another preferred embodiment, the plasma focusing electromagnets are disposed so that the diameter of the lines of magnetic flux at the cathode end face becomes smaller than the diameter of the capillary tube at the end face of the capillary tube. In addition, the positions of the cathode and the capillary tube are determined so that the diameter of the lines of magnetic flux at the cathode end face becomes smaller than the diameter of the capillary tube at the capillary tube end face. Alternatively, a taper having a diameter larger than that of the lines of magnetic flux at the cathode end face is formed near the end face of the capillary tube.

Other objects, characteristics and effects of the present invention will be clarified in the detailed description below.

DESCRIPTION OF THE PREFERRED EMBODIMENT

Figure 1:
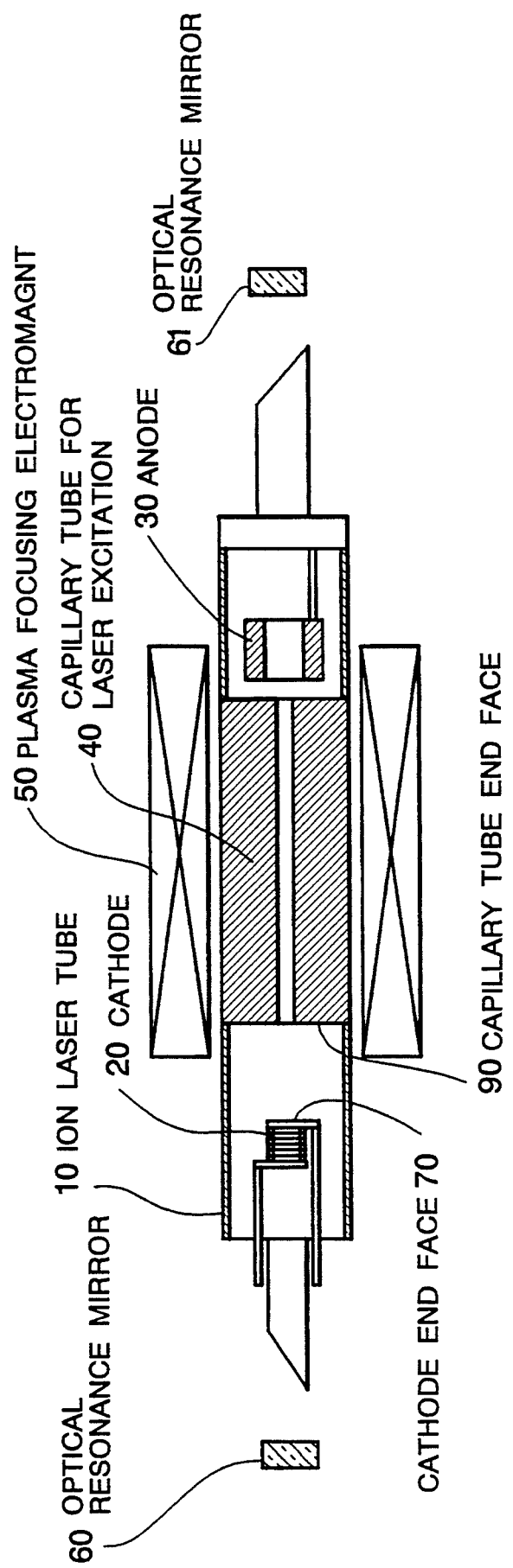
FIG. 1 is a schematic diagram to show the configuration of a gas laser oscillator according to an embodiment of the present invention.
Figure 2:
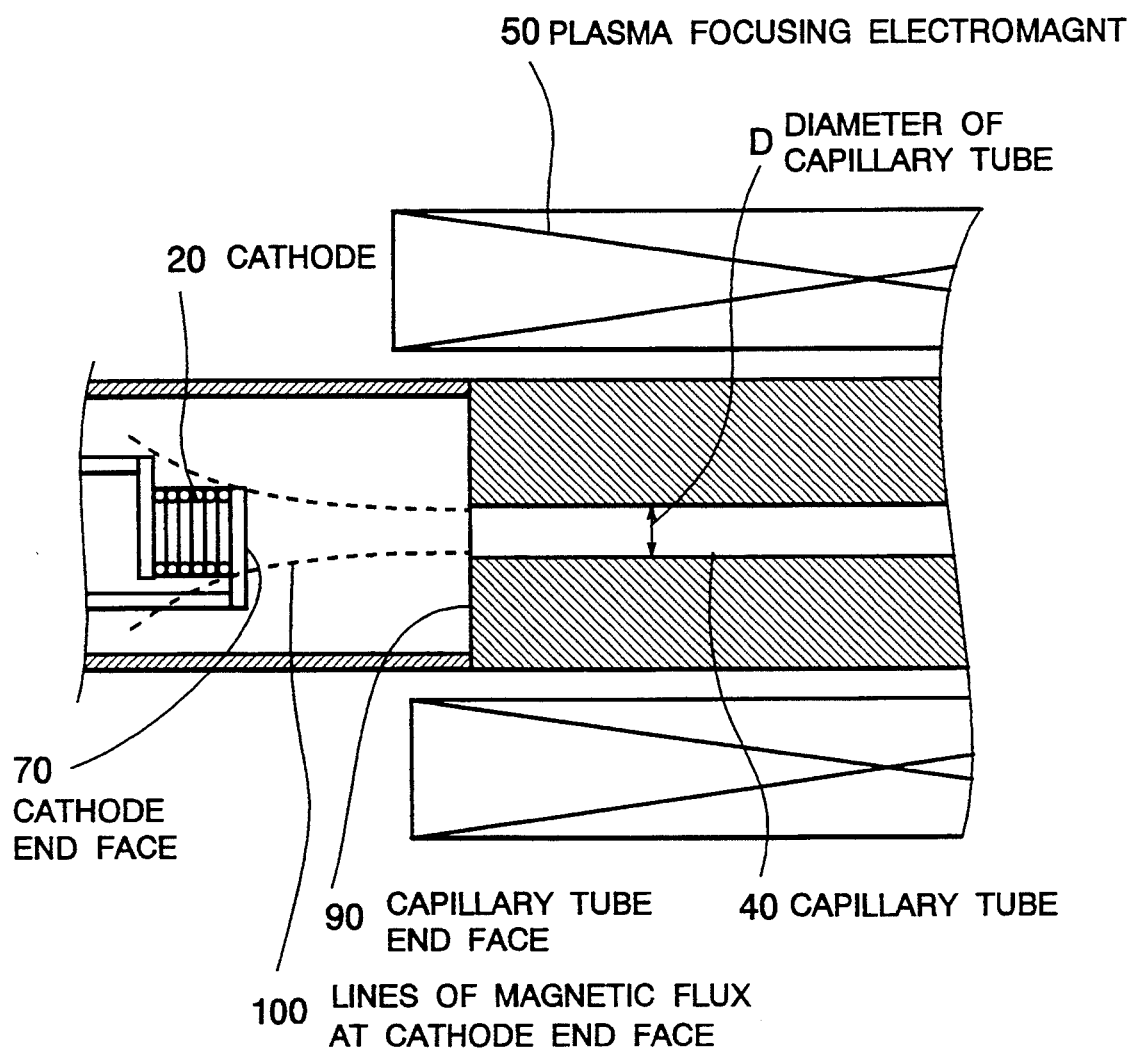
FIG. 2 is a partial enlarged view of the gas laser oscillator as shown in FIG. 1.

Referring to the attached figures, preferred embodiments of a gas laser oscillator according to the present invention will be described below. FIG. 1 is a diagram to show the outline of configuration for a gas laser oscillator according to an embodiment of the present invention, and FIG. 2 is a partial enlarged view of that gas laser oscillator. In FIGS. 1 and 2, a gas laser oscillator according to the present invention comprises an ion laser tube 10, an electromagnet for plasma focusing 50 and a pair of optical resonance mirrors 60 and 61.

The ion laser tube 10 contains gas laser medium such as argon gas inside, and consists of a capillary tube 40 provided with a through hole 41 having a diameter of D at the center, a cathode 20 and an anode 30 as discharging electrodes disposed at the ends of the capillary tube 40. The capillary tube 40 is made of, for example, ceramic or other similar materials. The electromagnet for plasma focusing 50 is disposed so as to surround the ion laser tube 10. The optical resonance mirrors 60 and 61 are of total reflection type and the optical resonance mirror 61 on the side of the anode 30 is a transmission type mirror which transmits several tens of percents of the light.

Application of voltage from a power supply (not shown) across the cathode 20 and the anode 30 of the ion laser tube 10 causes discharge, which generates plasma. The plasma focusing electromagnet 50 is placed under the direct current voltage in advance so that it causes a magnetic field which focuses the plasma generated between the cathode 20 and the anode 30. When the ion laser tube 10 performs plasma discharge, the optical resonance mirrors 60 and 61 cause the optical resonance so as to generate the laser beam.

In this embodiment, the magnetic field generated by the plasma focusing electromagnet 50 is designed to be not more than 100 gauss at the end face 70 of the cathode 20, because it is learned that the magnetic field not exceeding 100 gauss prevents plasma from being concentrated to a limited part on the cathode end face 70, resulting in much longer service life of the cathode 20. Specifically, it is known from experiments that the service life of the cathode 20 when the magnetic field at the cathode end face 70 is 100 gauss is twice the value when the magnetic field is 400 gauss (substantially the same magnetic field strength for conventional gas laser oscillators).

In addition, the gas laser oscillator of this embodiment is designed to have the lines of magnetic flux 100 at the cathode end face 70 smaller than the diameter D of the capillary tube at the end face 90 of the capillary tube 40 as shown in FIG. 2.

Figure 3:
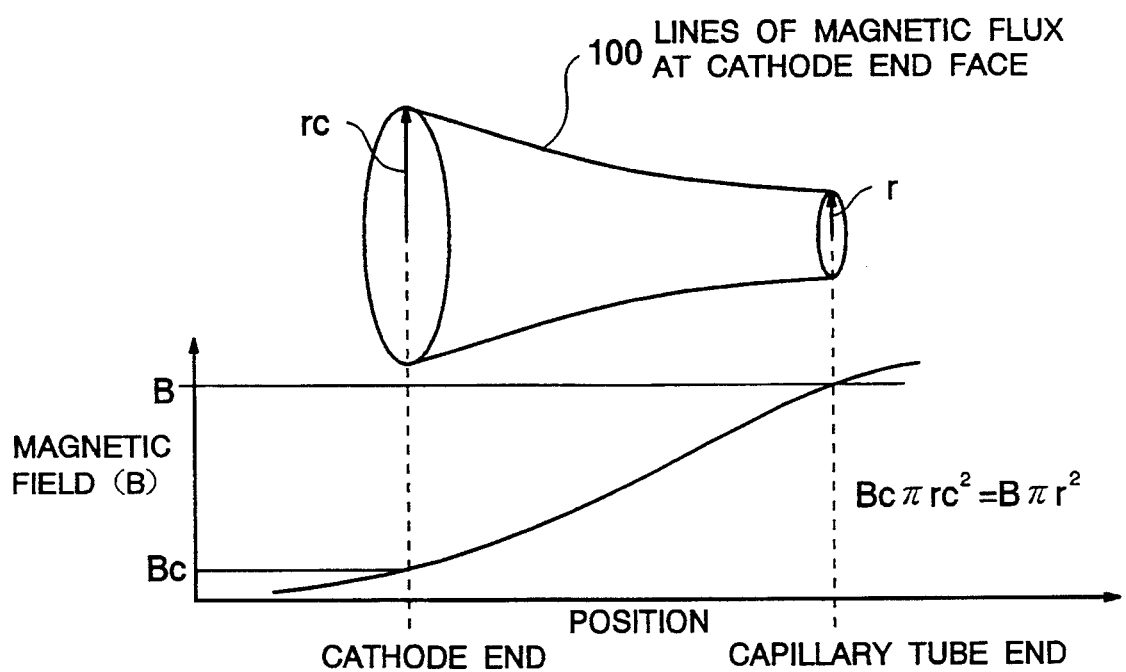
FIG. 3 is an explanatory view to illustrate the lines of magnetic flux at the end face of the cathode.

FIG. 3 shows the lines of magnetic flux 100 between the capillary tube end face 90 and the cathode end face 70. The axis of ordinate is for the magnetic field strength and the axis of abscissa is for the position of the cathode end face 70 and the capillary tube end face 90 in the ion laser tube 10.

In the figure, Bc represents the magnetic field at the cathode end face 70 (gauss), rc is the radius of the lines of magnetic flux at the cathode end face 70 when the magnetic field is Bc (mm), B is the magnetic field at the capillary tube end face 90 (gauss) and r is the radius of the lines of magnetic flux at the capillary tube end face 90 when the magnetic field is B.

Under these conditions, $$Bc \times \pi \times rc^2 = B \times K \times r^2$$

and the radius r of the lines of magnetic flux at the capillary tube end face 90 can be determined based on the above equation:

$$r = rc \sqrt{(Bc/B)} \quad (1)$$

In this embodiment, the magnetic field of the plasma focusing electromagnet 50 is adjusted so that the magnetic field Bc at the cathode end face 70 does not exceed 100 gauss and that the diameter (=2r) of the lines of magnetic flux determined by the magnetic field strength B at the capillary tube end face 90 is smaller than the diameter D of the capillary tube. The magnetic field of the plasma focusing electromagnet 50 can be adjusted by changing the direct current applied thereto or by changing the winding density of the coil in the plasma focusing electromagnet 50. The magnetic field can be determined from experiments as in the conventional practices.

There are several methods to keep the magnetic field strength at the end face 70 of the cathode 20 at 100 gauss or less. In addition to the method where the magnetic field strength caused by the plasma focusing electromagnet 50 is changed, the following methods may be used. Noting that the magnetic field strength in the ion laser tube 10 depends on the position in the ion laser tube 10 as shown in FIG. 3, the cathode end face 70 may be moved to a position where the magnetic field becomes 100 gauss or less with keeping the magnetic field strength caused by the plasma focusing electromagnet 50 as it is. Specifically, the cathode end face 70 is moved so as to increase the distance from the plasma focusing electromagnet 50, and then the distance between the plasma focusing electromagnet 50 and the cathode end face 70 is changed until the magnetic field Bc at the cathode end face 70 becomes 100 gauss or less. Alternatively, the winding start point in the coil of a plasma focusing electromagnet 50 is adjusted until the magnetic field Bc at the cathode end face 70 becomes 100 gauss or less.

Then, the diameter of the lines of magnetic flux (=2r) determined by the magnetic field strength B at the capillary tube end face 90 is made to be smaller than the diameter D of the capillary tube. Specifically, since the radius r of the lines of magnetic flux at the capillary tube end face 90 varies as shown in FIG. 3 according to the above equation (1), the position of the capillary tube end face 90 is adjusted to a place where the diameter of the lines of magnetic flux 2r becomes smaller than the diameter D of the capillary tube 40. Alternatively, by increasing the winding density of the coil in the plasma focusing electromagnet 50 near the capillary tube end face 90, the strength of the magnetic field B at the capillary tube end face 90 may be enhanced until the diameter of the lines of magnetic flux (=2r) becomes smaller than the diameter D of the capillary tube.

With the above setting, electrons generated at the cathode 20 are pulled toward the lines of magnetic flux 100 at the cathode end face 70, and led to the inside of the capillary tube 40. This reduces sputtering at the capillary tube end face 70 and thereby elongates the service life of the ion laser tube 10.

Figure 4:
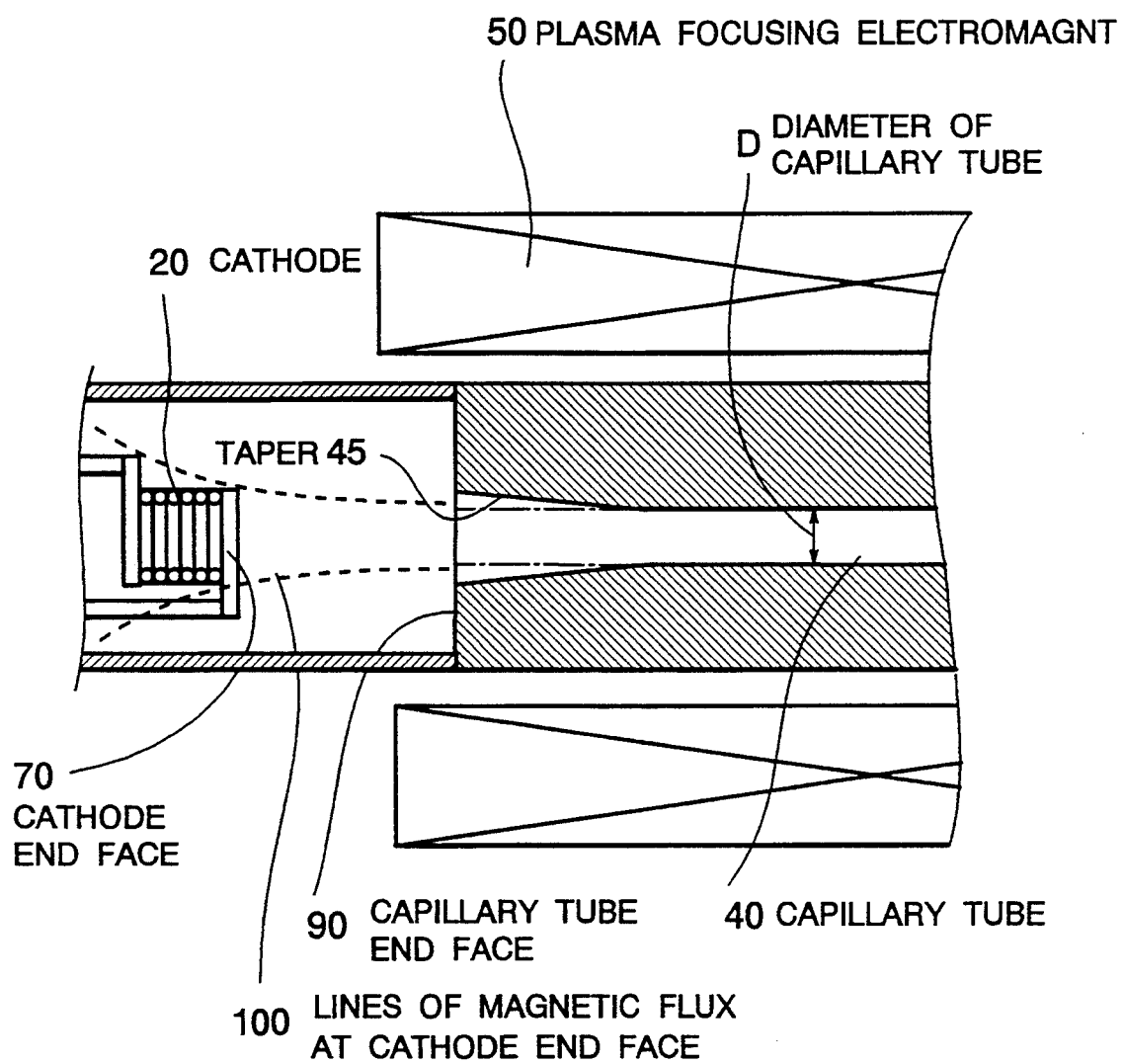
FIG. 4 is a schematic diagram to show the configuration of a gas laser oscillator according to another embodiment of the present invention.

In the above embodiment, the diameter D of the capillary tube 40 is kept constant while the position of the capillary tube end face 90 is moved or the diameter (=2r) of the lines of magnetic flux is adjusted corresponding to the diameter D. FIG. 4 shows another embodiment where the sputtering at the capillary tube end face 70 is suppressed without changing the position of the capillary tube end face 90 or the diameter of the lines of magnetic flux. A gas laser oscillator according to this embodiment, without changing the position of the capillary tube end face 90 or the magnetic field strength, forms a taper 45 as shown in the figure on the side of the capillary tube end face 90 of the capillary tube 40, with setting the diameter of the taper 45 to be larger than the diameter of the lines of magnetic flux. In this case, too, electrons caused by the cathode 20 are pulled toward the lines of magnetic flux and led to the capillary tube 40. Therefore, the sputtering at the capillary end face 70 is suppressed.

As learned from the above description, limitation of the magnetic field strength at the cathode end face 70 to a value not more than 100 gauss eliminates concentration of discharge plasma to a limited part of the cathode end face 70, which results in lower deterioration of the cathode 20. In addition, since the diameter of the lines of magnetic flux 100 at the cathode end face 70 is designed to be smaller then the capillary tube diameter D at the capillary tube end face 90, electrons generated at the cathode 20 are pulled by the magnetic field toward the lines of magnetic flux 100 at the cathode end face 70. This realizes sufficient focusing of plasma at the capillary tube end face 90 with reducing sputtering at the capillary tube end face 90, resulting in elongated service life of the ion laser tube 10.

Obviously, various modifications can be made to the above embodiments. For example, the magnetic field strength at the cathode end face 70 is set at 100 gauss or less and at the same time the diameter of the lines of the magnetic flux 100 at the cathode end face 70 is set smaller than the diameter D of the capillary tube at the capillary tube end face 90 in the above embodiment, but the service life of the ion laser tube 10 can be elongated just by setting the magnetic field strength at the cathode end face 70 to be 100 gauss or less, or just by setting the diameter of the lines of magnetic flux 100 at the cathode end face 70 to be smaller then the diameter D of the capillary tube at the capillary tube end face 90. It is intended to cover in the appended claims all such modifications as fall within the true scope and spirit of the present invention.

What is claimed is:

1. A gas laser oscillator comprising:
    an ion laser tube having an active gas medium, a capillary tube, and having an anode and a cathode as discharging electrodes disposed at its both ends,
    plasma focusing electromagnets disposed around said ion laser tube in order to generate a magnetic field for focusing plasma, and
    a pair of optical resonance mirrors disposed at both ends of said ion laser tube,
    a radius of said capillary tube being smaller than a radius of the lines of the magnetic flux at said cathode end face which is expressed by $$r = rc \sqrt{(Bc/B}$$

where: a radius of the lines of the magnetic flux at said cathode end face is "r", a radius of said cathode is "rc", a magnetic field strength of the cathode is Bc, and the magnetic field strength is taken at the end face of the capillary tube.

2. A gas laser oscillator of claim 1 wherein the magnetic field of said plasma focusing electromagnets is adjusted so that the magnetic filed strength at said cathode end face is 100 gauss or less.

3. A gas laser oscillator of claim 1 wherein said cathode is disposed at such a position that the magnetic field strength at the cathode end face is 100 gauss or less.

4. A gas laser oscillator of claim 1 wherein the magnetic field strength at the end face of said cathode is at 100 gauss or less.

5. A gas laser oscillator of claim 1 wherein a taper having a diameter larger than the diameter of the magnetic field comprising lines of magnetic flux at said cathode end face is formed near the end face of said capillary tube.

6. A gas laser oscillator of claim 1 wherein the position of the capillary tube is such that the radius of said capillary tube is smaller than the radius of the lines of the magnetic flux at said cathode end face.

7. A gas laser oscillator comprising:
    an ion laser tube having an active gas media, a capillary tube, and an anode, and a cathode as discharging electrodes disposed at its both ends,
    plasma focusing electromagnets disposed around said ion laser tube to generate magnetic field for plasma focusing and
    a pair of optical resonance mirrors disposed at both ends of said ion laser tube,
    said magnetic field having a diameter of its lines of magnetic flux at said cathode end face, said diameter being smaller than a diameter of the capillary tube at the end face of the capillary tube.

8. A gas laser oscillator of claim 7 wherein said plasma focusing electromagnets are disposed so that the diameter of the lines of magnetic flux in the magnetic field at said cathode end face is smaller than the diameter of the capillary tube at the end face of the capillary tube.

9. A gas laser oscillator of claim 7 wherein the positions of the cathode and the capillary tube are determined so that the diameter of the lines of magnetic flux in the magnetic field at said cathode end face is smaller than the diameter of the capillary tube at the capillary tube end face.

10. A gas laser oscillator of claim 7 wherein a taper having a diameter larger than that of the lines of magnetic flux at said cathode end face is formed near the end face of said capillary tube.

11. A gas laser oscillator comprising:
an ion laser tube having an active gas media, a capillary tube, and an anode, and a cathode as discharging electrodes disposed on its both ends,
plasma focusing electromagnets disposed around said ion laser tube in order to generate magnetic field for focusing plasma, and
a pair of optical resonance mirrors disposed at both ends of said ion laser tube, and
the magnetic field strength at the end face of said cathode is 100 gauss or less and said magnetic field has a diameter of its lines of magnetic flux at said cathode end face which is smaller than the diameter of the capillary tube at the end face of the capillary tube.

12. A gas laser oscillator of claim 11 wherein the magnetic field of said plasma focusing electromagnets is adjusted so that the magnetic filed strength at said cathode end face is 100 gauss or less.

13. A gas laser oscillator of claim 11 wherein said cathode is disposed at such a position that the magnetic field strength at the cathode end face is 100 gauss or less.

14. A gas laser oscillator of claim 11 wherein said plasma focusing electromagnets are disposed so that the diameter of the lines of magnetic flux at said cathode end face is smaller than the diameter of the capillary tube at the end face of the capillary tube.

15. A gas laser oscillator of claim 11 wherein the positions of the cathode and the capillary tube make the diameter of the magnetic field comprising lines of magnetic flux at said cathode end face smaller than the diameter of the capillary tube at the capillary tube end face.

16. A gas laser oscillator of claim 11 wherein a taper having a diameter larger than the diameter of the magnetic field comprising lines of magnetic flux at said cathode end face is formed near the end face of said capillary tube.

* * * * *